May 30, 1933. L. M. LANDING 1,911,516
MOWER FOR HIGHWAYS
Filed May 1, 1931 2 Sheets-Sheet 1
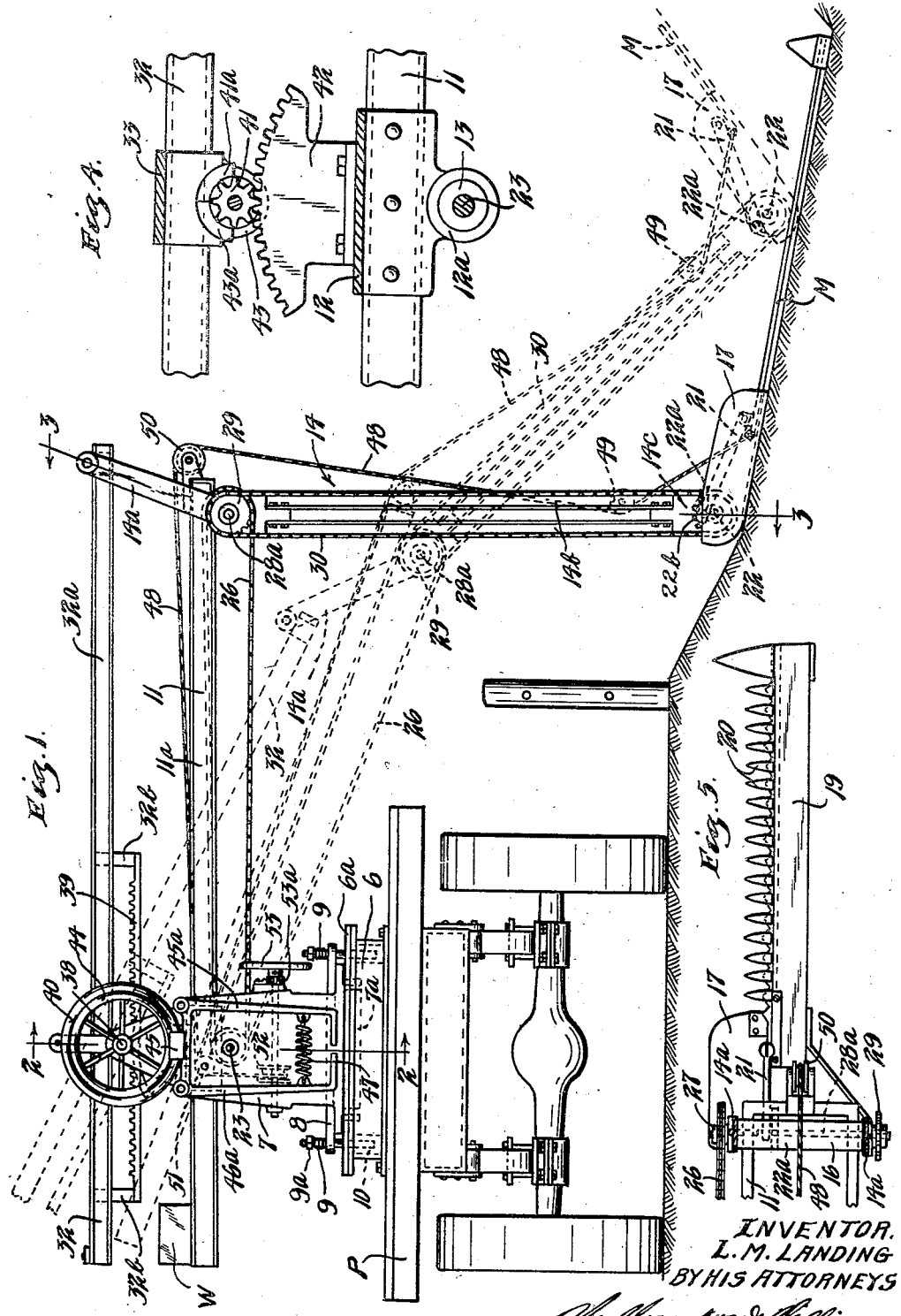
INVENTOR.
L. M. LANDING
BY HIS ATTORNEYS

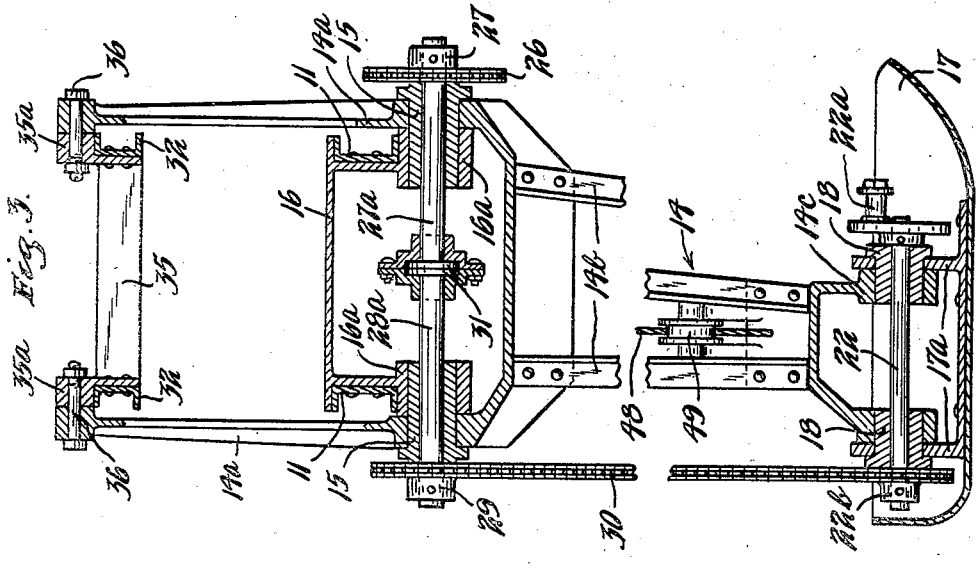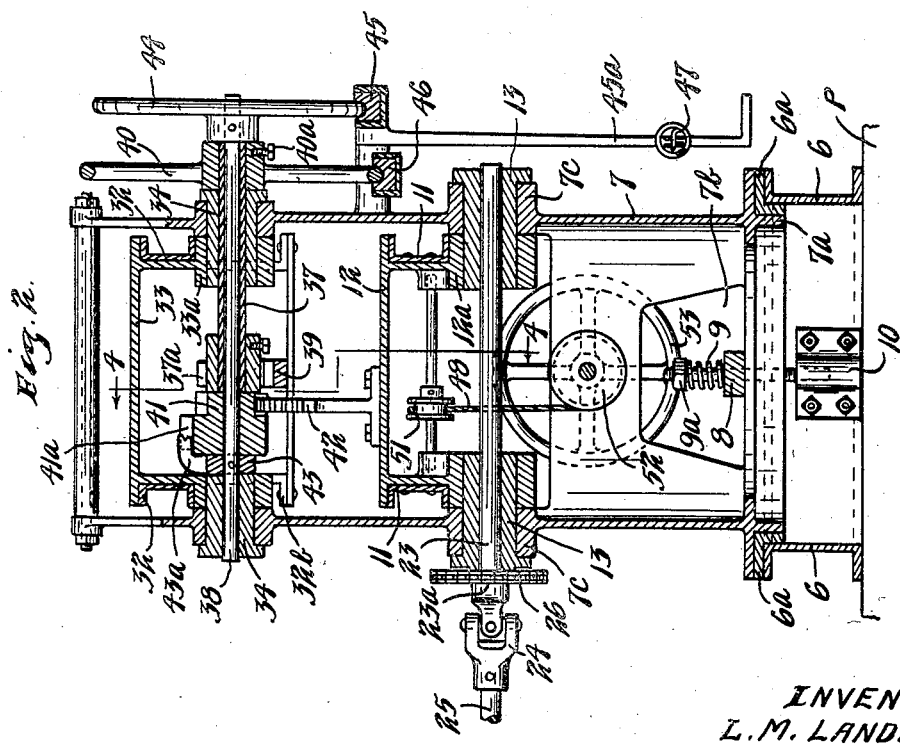

Patented May 30, 1933

1,911,516

UNITED STATES PATENT OFFICE

LARS M. LANDING, OF GLENWOOD, MINNESOTA

MOWER FOR HIGHWAYS

Application filed May 1, 1931. Serial No. 534,289.

This invention relates to mowing machines for cutting the vegetation at the sides of a highway.

At the present time it is a costly and laborious task to mow the shoulders, ditches and banks at the sides of a highway and a large proportion of this work must be manually performed.

It is an object of my present invention to provide an efficient mowing machine adapted to be supported from and to travel over a highway and adjustable for mowing the shoulders, ditches and banks at the sides of the highway.

It is a further object to provide a mowing machine of the class described wherein the angulation of the mower head and all adjustments may be controlled from the truck or other vehicle on which the device is supported.

Another object is to provide a mowing machine of the class described wherein flexible driving connections are provided for driving the sickle bar from a source of power carried by the supporting vehicle.

More specifically it is an object to provide a mowing machine of the class described which may be conveniently mounted upon a truck or other vehicle, which has overhanging and adjustable supporting means for holding the cutter bar and mower proper in various angulated positions and at various distances from the side of the truck or supporting vehicle.

These and other objects and advantages of the invention will be fully set forth in the following description made in connection with the accompanying drawings, in which like reference characters refer to similar parts throughout the several views, and in which:

Fig. 1 is a rear elevation showing an embodiment of my invention supported from a truck, adjusted for mowing vegetation at one side of the ditch of a highway, the dotted lines showing another position of the device for mowing the bank at the opposite side of the ditch;

Fig. 2 is a vertical section taken approximately on the line 2—2 of Fig. 1, showing the pivotal mountings for the supporting beam and the traveling beam;

Fig. 3 is a vertical section taken approximately along the line 3—3 of Fig. 1 showing the connection between the traveling beam and the supporting beam and showing the depending support for the mower head;

Fig. 4 is a cross section taken on the line 4—4 of Fig. 2 showing the means for adjusting the heavy supporting beam and for providing freedom for limited upward swinging movement of said beam when the shoe of the mower encounters an obstruction, and Fig. 5 is a top plan view of the mower head.

As shown in the drawings, my device is supported upon the platform P of a suitable truck, an oblong annular base 6 being provided which may be constructed of channel iron disposed edgewise and bolted to platform P. Base 6 holds a flanged bearing plate 6a which is provided with a flanged annular inner periphery receiving the depending annular flange 7a of a heavy hollow pedestal 7. The lower portion of pedestal 7 may be provided with diametrically disposed recesses 7b in the peripheral wall thereof through which a pressure bar 8 extends yieldingly held against the upper edge of the horizontal lower flange of pedestal 7 by means of coil springs 9 mounted on pressure bolts 9a, which bolts threadedly engage suitable sockets 10 secured to the inner periphery of the base 6. The pedestal 7 is thus mounted for limited oscillation upon the base 6 and preferably may swing through approximately 90 degrees.

A heavy supporting beam indicated as an entirety by the numeral 11 is journaled on a horizontal axis in the medial portion of pedestal 7 and as shown comprises a pair of parallel channel members 11a rigidly secured together by means of a heavy yoke 12 which carries a pair of depending axially aligned bearings 12a journaled on trunnion sleeves 13. Trunnion sleeves 13 are mounted in heavy bearing bosses 7c as clearly shown in Fig. 2. The longer or outer end of supporting beam 11 carries a swingable depending and rigid mower-head-support indicated as an entirety by the numeral 14. As shown, this mower head support comprises a heavy yoke 14a provided with axially aligned trunnion sleeves 15 which are journaled in the bearings 16a of a heavy bracket 16 rigidly secured to the outer ends of the channel irons 11a of the supporting beam (see Fig. 3). A series of spaced angle irons 14b are rigidly connected at their upper ends with a depending flange provided by yoke 14a and said angle bars at their lower ends carry an inverted yoke 14c which is pivotally connected with a mower head shoe 17 by means of trunnion sleeves 18 carried by a U-shaped bracket 17a. The mower head M is detachably connected with shoe 17 and comprises the usual reciprocating sickle bar 19, slidably mounted in the guards 20 of the cutter bar and reciprocated by means of a pitman connection 21 which is connected with the crank 22a of a crank shaft 22 suitably journaled in the trunnion sleeves 18 (see Figs. 3 and 5).

Crank shaft 22 is driven from a source of rotary power mounted on the truck through flexible driving connections mounted on the supporting beam 11 and on mower-head-support 14. As shown, a driving shaft 23 is journaled in the trunnion sleeves 13 of pedestal (see Fig. 2) and said shaft is connected by a universal coupling 24 with a shaft 25 which may be a power-take-off shaft connected with the driving shaft of the truck engine or which may be the driving shaft of an independent motor mounted on the platform P of the truck. Driving shaft 23 carries a sprocket 23a which is connected by an endless flexible member, such as a chain 26 with a sprocket 27 mounted on a short shaft 27a which is journaled in one of the trunnion sleeves 15 disposed in yoke 14a (see Fig. 3). Shaft 27a is coupled and frictionally connected with an axially aligned short shaft 28a which is journaled in the second trunnion sleeve 15 and shaft 28a carries at its outer end a sprocket 29 which is connected for driving by means of endless chain 30 with a sprocket 22b carried by the crank shaft 22. The frictional coupling between shafts 27a and 28a may consist in a pair of clamping disks 31 which surround and frictionally clamp together friction heads or flanges at the inner ends of shafts 27a and 28a.

A traveling adjusting beam 32 is mounted above supporting beam 11 and is supported from the upper end of pedestal 7. Beam 32 is mounted for swingable movement on a horizontal axis and also for longitudinal sliding movement. The beam, as shown, comprises a pair of parallel channel bars 32 rigidly secured together at intermediate portions by a pair of widely spaced cross heads 32b. The parallel channel irons are slidably mounted in a heavy inverted yoke 33, the arms of which carry axially aligned bearings 33a pivotally connected with apertured and bossed portions at the upper end of pedestal 7 by means of trunnion sleeves 34. Beam 32 is thus longitudinally adjustable in its carrying yoke 33 and may be swung on the axis of the yoke.

The outer ends of the channel bars 32a constituting beam 32 are rigidly connected by means of a cross bar 35 and said cross bar carries a pair of heavy upstanding bearing lugs 35a which are pivotally connected to the upper ends of the yoke arms 14a by means of pivot pins 36 (see Fig. 3). Combined longitudinal movement and swinging movement of traveling beam 32 will thus swing yoke 14a and with it the rigidly connected mower-head-support 14.

Longitudinal or traveling movement of beam 32 is effected and controlled (see Figs. 1 and 2) by means of a pinion 37a fixed to a sleeve 37 and meshing with a suitable rack 39 which is secured below beam 32 extending longitudinally thereof and rigidly attached to the two cross heads 32b. The sleeve 37 is journaled in one of the trunnion sleeves 34 and surrounds a shaft 38, one end of which is journaled in the opposite trunnion sleeve 34. The outer end of sleeve 37 is provided with a hand wheel 40 which as shown is attached to said sleeve by means of a set screw 40a.

The swinging of the supporting beam 11 in the embodiment illustrated is effected by the following mechanism. A pinion 41 is loosely mounted on shaft 38 disposed just forwardly of pinion 37a and said pinion meshes with a heavy gear segment 42 (see Figs. 2 and 4) which is rigidly attached to the pivot yoke 12 of the supporting beam. Pinion 41 carries a stop lug 41a which is adapted to engage with a stop lug 43a carried by a collar 43 which is fixed to shaft 38. A hand wheel 44 is rigidly secured to the rear end of shaft 38 just outwardly of hand wheel 40 and controls the movement of shaft 38 and consequently the driving of pinion 41 through the connection of lugs 41a and 43a. The shorter end of supporting beam 11 may be provided with a counter-weight W to facilitate the swinging of the supporting beam. The combined weight of the longer end of beam 11, the mower head and the mower-head-support should slightly over-balance the short end of the supporting beam with the counterweight thereon. It will be noticed by reference to Fig. 4 that normally the outer end of supporting bar 11 with the weight of the mower head and mower-head-support thereon will swing the supporting beam to a point where the lugs 41a and 43a are in engagement. When it is desired to elevate the outer end of the supporting beam collar 43 will be turned through approximately 180 degrees before pinion 41 will be moved.

I provide suitable mechanism for locking shaft 38 and sleeve 37 which, as shown, comprises a pair of braking shoes 45 and 46 respectively pivoted below wheels 44 and 40 to the supporting pedestal 7 and having depending bell crank arms 45a and 46a which are spaced apart as clearly shown in Fig. 1 and urged together by a strong coil spring 47. Shoes 45 and 46 carry blocks of suitable abrasive or compressible material for engaging the respective wheels 44 and 40 and preventing the same from turning. The extremities of bell crank arms 45a and 46a may be inturned to constitute pedals by which the locking brakes may be released when it is desired to manipulate the hand wheels.

Mower bar M and shoe 17 may be angularly adjusted relative to the mower-head-support 14 by suitable means controllable from the platform of the truck and operative to swing the mower bar upon the axis of trunnion sleeves 18 (see Fig. 3). To this end I attach a flexible element, such as a cable, 48 to mower bar supporting shoe 17 at a point removed some distance from the said axis and this cable is guided over a pulley 49 mounted adjacent the lower end of mower-head-support 14, passes over a pulley 50 carried at the outer extremity of supporting beam 11 and is then guided by a small pulley 51 mounted on the pivot yoke 12 for the supporting beam (see Fig. 2) and attached to a windlass 52 which is controlled by means of hand wheel 53, said hand wheel having a ratchet and pawl connection 53a with the pedestal 7 to retain the same in a desired position.

*Operation*

In use, the truck or vehicle on which my device is mounted travels at comparatively slow speed along the highway adjacent the right shoulder of the road. Pedestal 7 is swung to a position where the supporting beam 11 and traveling beam 32 are disposed transversely of the road and by releasing the locking brakes 45 and 46 and manipulating hand wheels 40 and 44 the beams may be adjusted to position the lower end of the mower-head-support 14 for cutting the particular portion at the side of the road desired. As shown in full lines in Fig. 1, the device is adjusted for cutting one side of the ditch and the supporting beam is disposed in substantially horizontal position with the mower-head-support 14 disposed substantially vertical. The angulation of the mower bar is adjusted by means of the windlass controlled by hand wheel 53. It will be noticed that the supporting beam nicely clears the fence or guard rail at the shoulder of the highway.

Shoe 17 rests upon and travels over the ground and the reciprocating sickle bar cooperating with the shearing edges of the guards will of course cut the weeds and herbage in the conventional manner. Flexible driving connections including the chains 26 and 30 effect the driving of the sickle bar in all adjusted positions of the device.

In the event that a heavy obstruction which the driver fails to see is encountered, no damage will be done to the machine, since pedestal 7 is mounted for oscillation and permits the heavy beams 11 and 32 to be swung clear without breakage of the parts. In the event that small irregularities in the surface of the ground are encountered by shoe 17, the supporting beam 11 and beam 32 are free to swing upwardly a limited distance because of the play provided between connection or driving lugs 41a and 43a of the tilting control mechanism for the supporting beam.

In Fig. 1 the dotted lines indicate an adjusted position of the device for cutting the outer side of the ditch. It will be noticed that in such position the outer end of the supporting beam 11 has been swung downwardly and traveling beam 32 has been moved longitudinally to swing the mower-head-support 14 to an inclined position disposing the supporting shoe 17 for the mower bar at substantially the bottom of the ditch. It will thus be seen that through the combined movements of supporting beam 11 and traveling beam 32 considerable adjustment may be made in the length of the overhanging support for the mower proper and also in the height at which shoe 17 is carried. The device may be utilized for mowing banks at the sides of the roadway which are elevated above the actual surface of the road.

When not in use, pedestal 7 may be swung on its base 6 through approximately 90 degrees to substantially align the elongated beams 11 and 32 with the body of the vehicle.

It will be, of course, understood that mower bars M of various lengths may be detachably connected with the shoe 17 as desired for the particular work to be performed.

From the foregoing description it will be seen that I have provided a strong, durable and highly efficient mower for operation upon the shoulders, ditches and banks at the sides of a highway, capable of wide adjustment and controllable from the vehicle upon which the parts are supported. Successive swathes may be cut with my device, and the expense and time required in performing the cutting is greatly decreased in comparison with methods utilized at the present time.

It will, of course, be understood that various change may be made in the form, details, proportions and arrangement of the parts, without departing from the scope of my invention, which, generally stated consists in a device capable of carrying out the objects above set forth and in the novel parts and combinations of parts disclosed and defined in the appended claims.

What is claimed is:—

1. In a mowing machine for highways, a supporting vehicle, an upright pedestal mounted on said vehicle for limited oscillation on a vertical axis, a supporting beam connected with said pedestal for swinging movement on a horizontal axis, a depending rigid supporting member connected with the outer end of said supporting beam, means for adjusting the position of said supporting beam and a mower device carried by the lower end of said supporting member and having ground engaging means associated therewith and means for driving said mower device.

2. In a mowing machine for highways, a supporting vehicle, an upright pedestal mounted on said vehicle, a supporting beam connected with said pedestal for swinging movement on a horizontal axis, rotary means mounted on said pedestal for controlling the movement of said beam, means for locking said rotary controlling means, a mower device supported from the outer end of said beam and means for driving said mower device.

3. The structure set forth in claim 2, and said rotary controlling means having sufficient play to permit slight upward swinging movement of the outer end of said beam when said controlling means is locked.

4. In a mowing machine for highways, a supporting vehicle, a mower-supporting beam mounted on said vehicle and adapted to overhang the shoulder of a road, a depending supporting member pivoted to the outer end of said beam, a mower device attached to the lower end of said supporting member, means for driving said mower device and a traveling beam mounted on said vehicle for longitudinal movement and connected with said depending supporting member to vary the angulation thereof relative to said supporting beam.

5. In a mowing machine for highways, a supporting vehicle, an upright pedestal mounted on said vehicle, a supporting beam connected with said pedestal for swinging movement on a horizontal axis, means for adjusting the position of said supporting beam, a depending rigid supporting member pivoted to the outer end of said supporting beam, a mower device connected with the lower end of said supporting member, a yoke mounted on said pedestal for swinging movement on a horizontal axis parallel with the axis of said supporting beam, a traveling beam slidably mounted in said yoke and pivotally connected at its outer end with said depending supporting member, means on said pedestal for longitudinally adjusting the position of said traveling beam and means for driving said mower device.

6. In a mowing machine for highways, a supporting vehicle, a mower supporting beam mounted on said vehicle for swinging movement on a horizontal axis and adapted to overhang the shoulder of a road, means for adjusting the position of said supporting beam, a depending rigid supporting member connected with the outer end of said beam, a mower device pivotally attached to said depending supporting member, means controllable from said vehicle for adjusting the angulation of said mower device with respect to said depending supporting member and means for driving said mower device.

7. The structure set forth in claim 6, said means comprising a source of power available from said vehicle and flexible driving connections between said source of power and said mower device.

8. In a mowing machine for highways, a supporting vehicle, an upright pedestal mounted on said vehicle, a mower supporting beam connected with said pedestal for swinging movement on a horizontal axis, a rotary adjusting element for swinging said beam, braking means engaging said rotary adjusting element, a depending rigid supporting member swingably connected with the outer end of said beam, a mower device supported from said supporting member and means for driving said mower device.

9. The structure set forth in claim 8, wherein said pedestal is frictionally mounted to permit limited oscillation on a vertical axis.

10. In a mowing machine for highways, a supporting vehicle, an upright pedestal mounted on said vehicle, a mower supporting beam connected with said pedestal for swinging movement on a horizontal axis said beam rigidly carrying a gear segment concentric with said axis of swinging movement, a beam adjusting shaft mounted in said pedestal, a pinion mounted on said shaft and meshed with said gear segment, means fixed to said shaft for interlocking with said pinion, with freedom for limiting play of said pinion relative to said shaft, a mower device connected with the outer end of said beam and means for driving said mower device.

11. In a mowing machine for highways, a vehicle, a supporting beam mounted on said vehicle for swinging movement on a horizontal axis and adapted to overhang the shoulder of a road, means for adjusting the position of said supporting beam, a rigid depending supporting member swingably connected with the outer portion of said supporting beam, means for adjusting the angulation of said depending supporting member with reference to said beam, ground engaging supporting means at the lower end of said depending supporting member, a mower device carried by the lower portion of said depending supporting member and means for driving said mower device.

12. The structure set forth in claim 11, and means controllable from said vehicle for adjusting the angulation of said mower device.

13. In a mowing machine for highways, a vehicle, a supporting beam mounted on said vehicle for swinging movement on a horizontal axis and adapted to overhang the shoulder of a road, means for adjusting the position of said supporting beam, a rigid depending supporting member swingably connected with the outer portion of said supporting beam, means for adjusting the angulation of said depending supporting member with reference to said beam, ground engaging supporting means at the lower end of said depending supporting member, said supporting beam being mounted with limited freedom for upward swinging movement to compensate for small irregularities of the ground, a mower device carried by the lower portion of said depending supporting member, a source of power available from said vehicle, and flexible driving connections between said source of power and said mower device.

In testimony whereof I affix my signature.

LARS M. LANDING.